Jan. 4, 1927.
O. M. NAYLOR
1,613,328
AUTOMATIC REVERSIBLE DOUBLE ACTING SOCKET WRENCH
Filed April 3, 1924
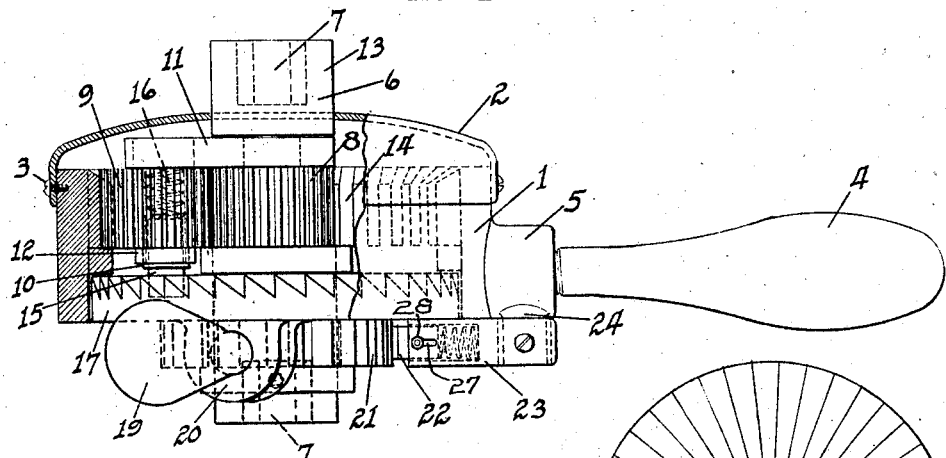
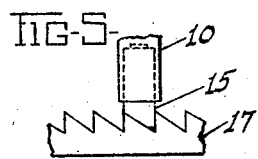
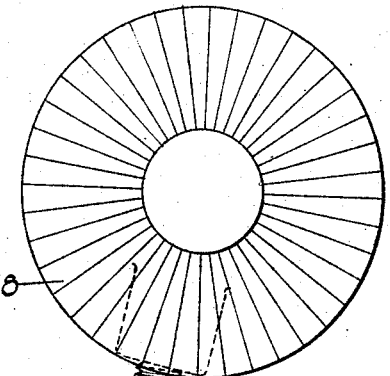
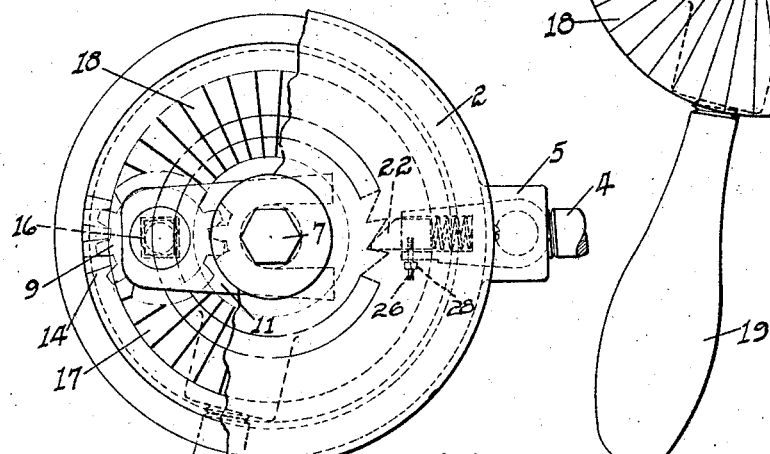
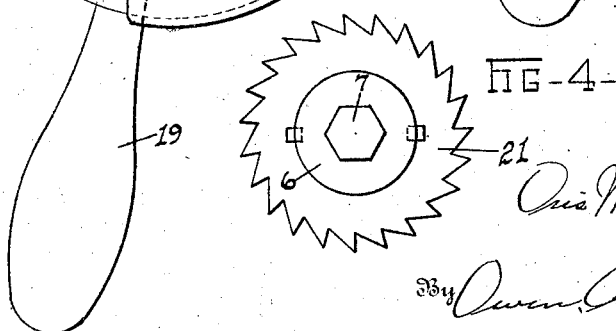

Patented Jan. 4, 1927.

1,613,328

UNITED STATES PATENT OFFICE.

ORIS M. NAYLOR, OF TOLEDO, OHIO.

AUTOMATIC REVERSIBLE DOUBLE-ACTING SOCKET WRENCH.

Application filed April 3, 1924. Serial No. 703,883.

My invention has for its object to provide a double-acting reversible device to produce substantially continuous rotation of a member in either direction by oscillatory movements of the device. The invention may be used for any purpose and may be contained in structures of different forms. The invention is particularly adapted for screwing and unscrewing bolts and nuts by manually operating the device embodying the invention. Thus a nut may be unscrewed by a rotative movement of the device first in one direction and then in the opposite direction. Likewise the nut or bolt may be screwed into place by similar operations of the device.

To illustrate a practical application of the invention I have selected a socket wrench containing the invention and shall describe it hereinafter. The structure selected is shown in the accompanying drawings.

Figure 1 illustrates a broken view showing the device embodying my invention partly in section and partly a side view thereof. Fig. 2 illustrates a top view of the device, the cover of the device being shown broken in order to illustrate some of the parts of the parts of the device. Fig. 3 illustrates a ratchet that forms one of the elements of the device, an edge view of the ratchet being shown in Fig. 1. Fig. 4 illustrates a top view of another ratchet, the edge view of which is also shown in Fig. 1. Fig. 5 illustrates a broken view of a rack and pawl.

The operative parts of the reversible double-acting wrench are supported on a shell 1. A major portion of the parts is contained in the shell 1 and is covered by means of the cap 2 that is secured to the upper edge of the shell 1 by any suitable means such as by the screws 3. A handle 4 is secured to the shell 1. Preferably, the shell 1 is provided with a boss 5 into which the handle 4 extends. If desired, the handle 4 may be threaded into the boss 5 to connect the handle 4 to the shell 1.

The part to be operated on by the device is suitably coupled to a rotatable element such as the shaft 6. Where the device is used for screwing and unscrewing bolts and nuts, the end of the shaft is provided with a suitable means for connecting it to the nuts or bolts. As shown in the structure, the ends of the shaft 6 are provided with hexagonal sockets 7 for receiving the nuts or the heads of the bolts. A gear wheel 8 may be keyed to the shaft 6. An idler 9 meshes with the teeth of the gear wheel 8. The idler pinion or gear wheel 9 is rotatably supported on a sleeve 10 that depends from an arm 11. It is secured in position between the outer end of the arm 11 and a threaded ring 12. The arm 11 is rotatably supported on the shaft 6, the shaft 6 having a reduced cross sectional area portion between the head 13 that is provided with one of the sockets 7 and the gear wheel 8. The arm 11 is freely movable around the shaft 6 except as it may be restricted by other elements of the device. The arm 11 is preferably forked in order that it may be readily slipped into position between the head 13 and the gear wheel 8. The shell 1 is provided with an internal gear 14 that meshes with the idler 9 and so that the idler 9 forms a mechanical connection for purposes of rotation between the gear wheel 8 and the internal gear 14 of the shell 1.

The sleeve 10 is provided with a dog 15 that is spring-pressed downward by the spring 16 which is located in the sleeve 10 and between the end of the dog 15 and the end of the sleeve 10. A ratchet 17 is located so as to be engaged by the dog when the dog is moved in one direction relative to the ratchet, and to be released from the dog when the dog is moved in the opposite direction. The ratchet 17 is in the form of a disc having the teeth 18 cut in its face and is rotatably located on the shaft 6. The ratchet 17 is provided with a handle 19. The ratchet may be provided with a boss 20 that is formed integral with the ratchet. If desired, the handle 19 may be threaded and screwed into the boss 20 in order to connect the handle to the ratchet. If the handle 19 is held stationary by one hand and the shell 1 is rotated in counter-clockwise direction by pressure on the handle 4, the shaft 6 will be rotated by reason of the movement transmitted through the gear wheels 14, 9 and 8. The direction of rotation of the shaft 6 will be opposite to that in which the shell 1 is moved by the operation of the handle 4. If, however, the handle 4 is moved in clockwise direction, the gear wheel 9 may be moved around the gear wheel 8 without imparting any positive movement to the gear wheel 8 by the movement of the shell 1 since the dog 15 may move over the teeth 18 of the ratchet 17.

In order to impart positive movement to the shaft 6 when the handle 4 and the shell 1 are moved in a direction such that the gear wheel 9 may be rotated about the gear wheel 8 without imparting rotation thereto, a ratchet 21 is keyed to the shaft 6 and the shell 1 is provided with a spring-pressed dog 22. The dog 22 is located in a sleeve 23 that is keyed to or otherwise secured to a lug 24 depending from the boss 5 of the shell 1. The dog 22 and the ratchet 21 are so related that when the handle 4 is moved in one direction the dog 22 will engage the ratchet 21 and when the handle 4 is moved in the opposite direction, the dog 22 will move over the teeth of the ratchet 21.

When the device is to be used for screwing a nut, the socket shown in the lower end of the shaft 6 is passed over the nut and the handles 4 and 19 are grasped by the operator. The handle 4 is moved clockwise while the handle 19 is held. This movement of the handle 4 relative to the handle 19 causes the rotation of the shaft 6 since the dog 22 will engage the ratchet 21 which is keyed to the shaft and the dog 15 will slide over the ratchet 17. When the handle 4 is moved in the opposite rotative direction, the dog 15 engages the ratchet 17 and the gear wheel 9 is held from bodily rotation that might be caused by the reverse movement of the shell since the dog 15 engages the ratchet 17. This movement, however, of the shell 1 will be transmitted through the gear wheel 9 to the gear wheel 8 that is keyed to the shaft 6, and, since the gear wheel 9 acts as an idler between the gear wheel 14 and the gear wheel 8, the shaft 6 is rotated in a direction such that it will continue to screw the nut as the handle 4 is oscillated back and forth. When the nut is to be unscrewed from the bolt; the wrench is turned over so that the socket shown at the upper end of the shaft 6 in Fig. 1, will be placed upon the nut. Oscillatory movements of the handle 4 will, by reason of the reversed position of the wrench, cause the nut to be unscrewed from the bolt.

If it is desired the direct connection between the shell 1 and the ratchet 21 may be eliminated by withdrawing the dog 22. The dog 22 is provided with pin 26 that extends through a slot 27 formed in the sleeve 23. The dog 22 may be withdrawn from the ratchet and maintained in its withdrawn position by the nut 28 that is screwed on to the pin 26 and clamped against the sleeve 23.

I have thus provided a simple efficient means whereby a continuous direct rotation may be caused in a member by an oscillatory movement in another member, thus tools of various kinds that require rotation for their performance such as drills, wrenches, etc., may be connected to the instrument embodying my invention and actuated.

I claim :—

1. In a wrench, three gear wheels forming a train of gears, means for releasably connecting two of the gear wheels to cause them to rotate in the same direction when one of the said two gear wheels is moved in one direction, means for maintaining the position of the third gear wheel to cause the said two gear wheels to rotate in reverse directions when said one of the two gear wheels is moved in the opposite direction.

2. In a wrench, a train of three gear wheels, a ratchet and a dog interconnecting two of the gear wheels, and another ratchet and a dog for maintaining the third gear wheel in position as against rotation about a point exterior to its axis when impressed to move in a certain direction for producing rotation of one of the gear wheels continuously in one direction while another of the gear wheels is oscillated.

3. In a wrench, a train of three gear wheels, a ratchet and dog for interconnecting two of the gear wheels and another ratchet and dog for maintaining the intermediate gear wheel as against rotation about the axis of one of the other two gear wheels, means for oscillating the other of the two gear wheels to produce continuous unidirectional movement of the said one of the two gear wheels.

4. In a wrench, a train of three gear wheels, one of the gear wheels being an internal gear wheel and having an axis common with one of the other gear wheels, a third gear wheel being an idler between the other two gear wheels, a ratchet and dog for connecting the two coaxially positioned gear wheels together, another ratchet and dog for maintaining the idler in position as against rotation about the axis of the other two gear wheels when impressed to rotate in a certain direction and means for oscillating the internal gear wheel.

5. In a wrench, a train of three gear wheels, one of the gear wheels being an internal gear wheel and having an axis common with one of the other gear wheels, a third gear wheel being an idler between the other two gear wheels, a ratchet and dog for connecting the two coaxially positioned gear wheels together, another ratchet and dog for maintaining the idler in position as against rotation about the axis of the other two gear wheels when impressed to rotate in a certain direction, means for oscillating the internal gear wheel, a socketed member connected to the central gear wheel and having an axis common to the common axis of the said two gear wheels.

In testimony whereof, I have hereunto signed my name to this specification.

ORIS M. NAYLOR.